Jan. 27, 1970   F. E. KARLSSON ET AL   3,491,863
SERVO OPERATED GEAR SHIFT BAR MECHANISM
Filed March 14, 1968                    2 Sheets-Sheet 1
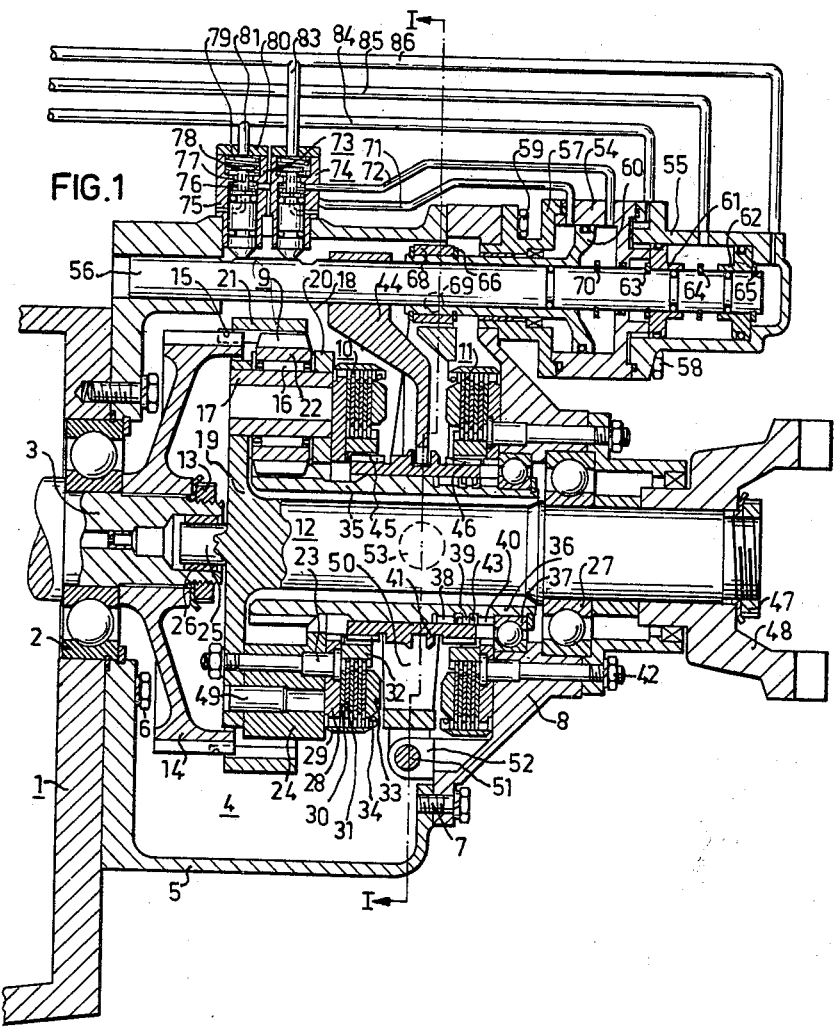
INVENTORS
Folke Elis Karlsson
Jan Erik Elander
Bengt Erik Cedendahl
By Pierce, Schiffler & Parker
Attorneys

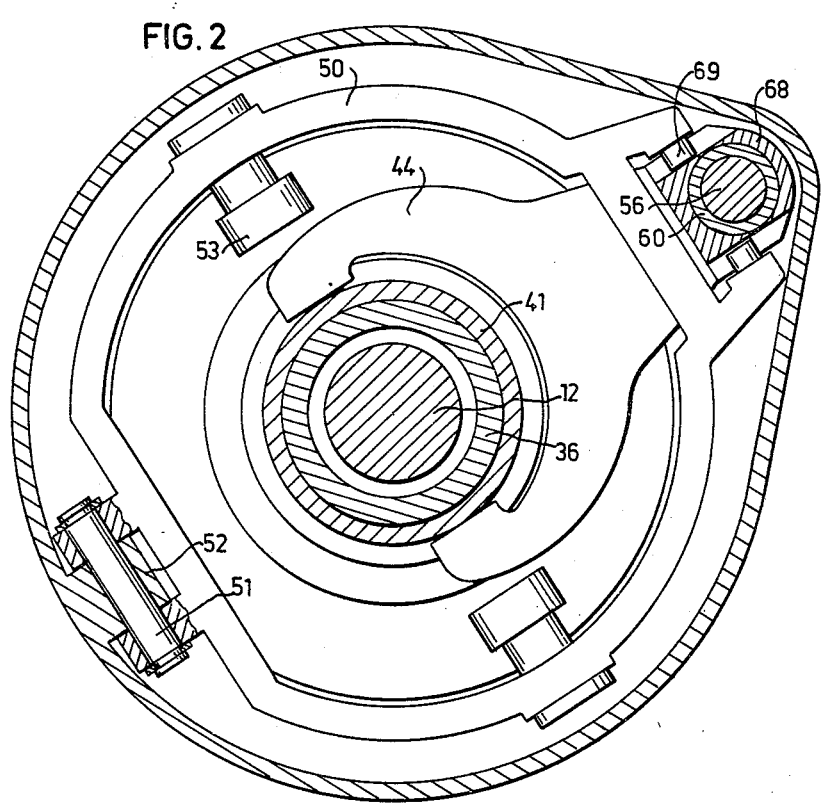

United States Patent Office 3,491,863
Patented Jan. 27, 1970

3,491,863
SERVO OPERATED GEAR SHIFT BAR MECHANISM
Folke Elis Karlsson, Jan Erik Elander, and Bengt Erik Cedendahl, Sodertalje, Sweden, assignors to Aktiebolaget Scania-Vabis, Sodertalje, Sweden, a corporation of Sweden
Filed Mar. 14, 1968, Ser. No. 712,990
Claims priority, application Sweden, Mar. 17, 1967, 3,731/67
Int. Cl. F16d 13/00, 67/00
U.S. Cl. 192—18          10 Claims

ABSTRACT OF THE DISCLOSURE

A servo operated gear shift bar mechanism in a gear change system comprises friction clutches for synchronized shifting operations of a power transmitting shifter collar displaceably mounted between two axially spaced gear ratio positions. The displacing movements of the shifter collar into and away from the respective gear ratio positions by means of a shifter fork or the like are responsive to axial movements of a gear shifting shaft which is parallel to the output shaft of the gear change system and is displaceably mounted in a gear box casing. The gear shifting shaft extends through a synchronizing cylinder and into a gear change cylinder and is employed as a common bearing shaft for individually displaceable pistons provided in the respective cylinders. These pistons are adapted under the action of pressure fluid supplied into the respective cylinders during different phases of a shifting operation to individually influence axial displacements of the gear shifting shaft. The piston of the synchronizing cylinder is connected to or adapted to act upon a clutch lever which controls engagement and disengagement of the friction clutches during a shifting operation.

---

This invention relates to a servo operated gear shift bar mechanism in a gear change system comprising friction clutches for synchronized shifting operations of a power transmitting shifter collar displaceably mounted between two axially spaced gear ratio positions, wherein the displacing movements of the shifter collar into and away from the respective gear ratio positions by means of a shifter fork or the like are responsive to axial movements of a gear shifting shaft which is parallel to the output shaft of the gear change system and displaceably mounted in a gear box casing.

The invention is especially suitable in connection with gear change systems for motor vehicles of the kind in which a multi-speed main gear box is combined with a supplementary gear box which is inserted between the main gear box and a transmission leading to the driving wheels of the vehicle. The purpose of such a supplementary gear box which usually is of the two-speed type is to double the possible number of different speeds of the main gear box between the engine and the transmission and to increase the total ratio coverage.

In British patent specification No. 949,029 and corresponding U.S. Patent No. 3,296,895 there is described and illustrated a supplementary gear box which by the provision of a planetary gear has two gear ratio positions and comprises a control mechanism for synchronized engagement of a shifter collar in one or the other of two gear ratio positions. This gear synchronizer has proved very effective for manual operation, but has some inconveniences if the shifting operation is accomplished by a servo device.

It is the object of this invention to eliminate these inconveniences and to simplify the synchronizing function with the use of non-positive friction clutches connected to the power transmitting members in each gear ratio position so that the shifting operations can be accomplished in a more rapid and flexible manner by servo-actuated means.

In accordance with the invention this object is attained due to the fact that the gear shifting shaft extends through a synchronizing cylinder and into a gear change cylinder and is a common bearing shaft for individually displaceable pistons provided in the respective cylinders, which pistons are adapted under the action of pressure fluid supplied into the respective cylinders during different phases of a shifting operation to individually influence actual displacements of the gear shifting shaft, the piston of the synchronizing cylinder being connected to or adapted to act upon a clutch lever which controls engagement and disengagement of the friction clutches during a shifting operation.

The clutch lever is devised and mounted in the casing of the supplementary gear box in a manner such that the required axial force on the piston of the synchronizing cylinder is substantially equal to half the clutch pressure of the respective friction clutch during synchronization.

Both servo cylinders are double-acting, and conduits from servo controlling means are connected to the different compartments of each cylinder, and each of the two compartments of the synchronizing cylinder communicates with an individual stationary two-way valve. The spindles of said valves abut against the gear shifting shaft, and transverse grooves or the like in said shaft act to impart to said spindles valve-controlling movements for engaging and disengaging the synchronizing cylinder.

According to a further aspect of the invention inlet ducts or outlet ducts of the two outer compartments of the gear change cylinder are of smaller cross-sectional area than the corresponding ducts of the synchronizing cylinder, whereby to obtain different filling velocities in the cylinders.

The piston of the synchronizing cylinder has a sleeve-like hub which extends through one end of the synchronizing cylinder so as to cooperate with the clutch lever. This piston is adapted upon axial movements to take the gear shifting shaft along with it, whereby to disengage the shifter collar from its gear ratio position, said piston being also adapted to actuate the clutch lever which in each gear ratio position in a manner known per se is adapted via a friction clutch to impart to the shifter collar a speed of rotation equal to that of the power transmitting members in the preselected gear ratio position, whereupon the piston of the gear change cylinder due to increased supply of pressure fluid to the gear change cylinder is enabled to cause continued displacement of the gear shifting shaft, whereby to accomplish final engagement in the preselected gear ratio position of the shifter collar connected to the gear shifting shaft.

The following description and the drawings exemplify a supplementary gear box provided with gear shift bar mechanism according to the invention. It should be noted, however, that the invention is not limited to the illustrated embodiment nor to the illustrated gear change system and can be modified in many ways to be used in different gear change systems within the scope of the invention.

FIG. 1 illustrates a longitudinal sectional view of a supplementary gear box comprising a planetary gear and a gear shift bar mechanism according to the invention and also illustrates the connection of the supplementary gear box to the rear part of the main gear box. FIG. 2 is a cross-sectional view along the line I—I in FIG. 1 and illustrates the mechanical members by means of which the shifting operations are controlled.

A supplementary gear box 4 including a gear shift bar mechanism according to the invention is adapted to be inserted between a main gear box 1 and a transmission leading to the driving wheels of a motor vehicle or the like. In accordance therewith, a front casing 5 of the supplementary gear box 4 is secured to the outer rear surface of the main gear box 1 by means of screws 6 extending through the front end wall of the gear box 4 and by means of a ball bearing 2 mounted in the end wall of the main gear box 1.

By means of a plurality of screw joints 7 the front casing 5 carries a rear casing 8, and the common housing formed by these casings accommodates a planetary gear 9 and two disc clutches 10, 11 which are provided centrally along a longitudinally extending shaft 12 which is the output shaft of the supplementary gear box 4.

The input shaft of the supplementary gear box 4 is the output shaft 3 of the main gear box 1. The shaft 3 is mounted in the radial ball bearing 2 and projects at its rear end into the supplementary gear box 4 in alignment with the shaft 12. Secured to the end of the shaft 3 by means of splines and a shaft nut 13 in conventional combination with a lock washer is an entraining member 14 in the form of a splined wheel which at one end is in mesh with an internal gear rim of a ring gear 21 forming part of the planetary gear 9. Axial displacement between the entraining member 14 and the ring gear 21 is prevented by a lock ring 15 which is received in grooves in all of the teeth.

The ring gear 21 is in mesh with a plurality of planet gears 22 which are mounted for rotation on a two-part planet carrier 18. This carrier consists of a circular disc 19 and a circular ring 20 having spacing hubs 24 between which the planet gears 22 are by means of needle bearings 16 movably mounted on pins 17 secured to the disc 19 and the ring 20. The components of the planet carrier 18 are assembled to a unit by a plurality of screw joints 23, a plurality of guide pins 49 driven into the disc 19 and the hubs 14 serving as entraining means for the composed unit.

The disc 19 is integral with the output shaft 12 which at its inner end is in the form of a journal 25 mounted in a bushing 26 in the rear end of the shaft 3. The other end of the output shaft 12 is mounted in anaxially guiding radial ball bearing 27 in the rear casing 8 and carries outside the supplementary gear box 4 an output member 48 which by means of splines and a lock nut 47 is secured to the shaft 12.

By means of the screw joint 23 the planet carrier 18 is also connected to a toothed clutch plate 28 in the disc clutch 10. The side of the clutch plate 28 which faces the planet carrier 18 has a collar on which an external disc carrier 29 is mounted and locked in axial direction. The disc carrier 29 has internal lands which are received in peripheral recesses in three external discs 30 and maintain these discs in equal angular positions. In a manner usual in disc clutches the discs 30 cooperate with a corresponding number of internal discs 31 so as to form a disc assembly having alternating external and internal discs 30 and 31, respectively. The internal discs 31 are maintained in equal angular positions by an internal disc-carrier 32 which has external lands engaged in internal recesses in the disc 31. By means of a flange abutting the clutch plate 28 the disc carrier 32 is fixed in the axial direction of the disc assembly.

Consequently, in accordance with the function of the clutch, the discs 30, 31 are locked in groups for relative rotation relative to their respective carriers 29, 32, whereas during engagement and disengagement the discs 30, 31 can move axially under the action of an annular clutch plate 33 acting upon the disc assembly. This clutch plate has peripheral recesses which fit the lands of the outer disc carrier 29 outside the discs, 30, 31 and is locked in position by a lock ring 34 provided on the outer disc carrier 29, which lock ring limits the disengaged position of the clutch plate 33.

The above described arrangement of the disc clutch 10 also holds true for the disc clutch 11, the toothed clutch plate 28 of which being secured to the rear casing 8 by means of a plurality of screw joints 42. Consequently, the toothed clutch plates 33 of the disc clutches 10, 11 in the assembled supplementary gear box 4 according to FIG. 1 are facing each other. By means of a clutch lever 50 pivotally mounted between the clutch plates 33 the disc clutches 10, 11 can be alternatively engaged and disengaged as required for the function of the clutches.

The clutch lever 50 is fork-shaped. By means of two lugs at the lower end of the lever the clutch lever 50 is pivotally mounted on a shaft 51 which is secured in a lug 52 formed in the lower portion of the rear casing 8. Each limb of the clutch lever 50 has a pin or the like with a roller 53. These rollers are on a level with the axis of the output shaft 12 and are adapted alternatively to actuate one or the other of the annular clutch plates 33 for pressing the respective disc assembly together. The turning movements of the clutch lever 50 are controlled by a synchronizing device to be described more in detail hereinbelow.

A sungear 35 is in mesh with the planet gears 22 and is centered thereby. The sun gear is formed with a sleeve 36 which by means of an axially guiding radial ball bearing 37 is mounted in the rear casing 8. The sleeve 36 has lands 38–40 and carries a shifter collar 41 which controls the shifting operations and by means of which the sun gear 35 is alternatively engaged with the planet carrier 18 or with the stationary rear casing 8 or is brought into a neutral position between the gear ratio positions referred to above. To this end the shifter collar 41 has an internal rim of lands 43 for alternative engagement with one of the land rims 38–40. The intermediate land rim 39 corresponds to the neutral position of the shifter collar 41 and has wider lands than the rims 38 and 40 so as to prevent in a conventional manner unintentional disengagement during torque transmission.

The outer ends of the shifter collar 41 have external toothed rims 45, 46 by means of which the shifter collar can be brought into mesh with the planet carrier 18 or with the rear casing 8. Irrespective of the gear ratio position of the shifter collar 41 the toothed rims 45, 46 are in permanent mesh with internal lands on the inner disc carriers 32 of the disc clutches 10, 11. Upon displacements of the shifter collar 41 the toothed rims 45, 46 will also come into mesh alternatively with an internal toothed rim on one or the other of the clutch plates 28 so as to obtain the high speed position of the supplementary gear box upon engagement with the disc clutch 10 or the low speed position upon engagement with the disc clutch 11.

FIG. 1 illustrates the various parts in the neutral position of the supplementary gear in which the disc clutches 10, 11 are disengaged and the ring gear 21 does not impart rotation to the planet carrier 18 and the output shaft 12 connected thereto. In this position the planet gears 22 operate as intermediate wheels which impart idle rotation to the sun gear 35 and the shifter collar 41 engaged therewith.

In the high speed position in which the shifter collar 41 has been moved to the left as viewed in FIG. 1 and is in engagement with the lands 38 of the sun gear as well as with the disc carrier 32 and with the toothed clutch plate 28, the disc clutch 10 has first been engaged and thereafter disengaged during the shifting operation in a manner to be described hereinbelow. This position is the direct gear position of the supplementary gear box in which the speed of the output shaft 12 is equal to that of the input shaft 3 as a result of the connection of the planet carrier 18 with the sun gear 35 via the disc clutch 10 and the shifter collar 41.

In the low speed position in which the shifter collar 41 is moved to the right as viewed in FIG. 1 and engages the lands 40 of the sun gear as well as the disc carrier 32 and the clutch plate 28, the disc clutch 11 has been engaged and disengaged during the shifting operation. In this low speed or indirect position of the supplementary gear box, the speed of the output shaft 12 is lower than that of the input shaft 3. As mentioned above, this is effected by locking the sun gear 35 to the stationary rear casing 8 via the disc clutch 11 and the shifter collar 41. In this position the planet gears 22 are rolling on the sun gear 35 and impart to the planet carrier 18 a speed which is lower than the speed of the ring gear 21.

Changes between the above named gear ratio positions are affected by a servo operated gear shift bar mechanism devised in accordance with the invention. This mechanism comprises a gear change cylinder 55 and a synchronizing cylinder 54 which together with an intermediate member 57 and by means of flanges and screw joints 58 are combined to a common unit which is directly connected to the rear casing 8 by means of a plurality of screws 59 or the like extending through the intermediate member 57.

The gear change cylinder 55 and the synchronizing cylinder 54 are adapted under the action of pressure fluid supplied to the respective cylinders to control the displacing movements of the shifter collar 41 via a gear shifting shaft 56. This shaft is displaceably mounted in the front casing 5 and extends in parallel relation to the output shaft 12 through the supplementary gear box 4 and passes through the rear casing 8. The rear end of the shaft 56 serves as a common bearing shaft for the pistons provided in the respective cylinder 54, 55. Secured to the gear shifting shaft 56 between the front casing 5 and the rear casing 8 is shifter fork 44 having two limbs which engage a groove in the shifter collar 41 with a clearance so as to take the collar with them upon axial displacements of the gear shifting shaft 56.

Mounted on the gear shifting shaft 56 within the gear change cylinder 55 are two individually axially displaceable pistons 61 and 62 which divide the cylinder into three compartments. Each compartment is by means of a conduit 84, 85 and 86, respectively, independently of the two other compartments in communication with a valve device, not shown, which controls supply into, and discharge from, each compartment of pressure fluid. The displacing movements of the pistons on the shaft 56 are limited by lock rings 63, 64, 65 secured to the shaft. The movement of the shaft is via the lock rings limited by fixed members defining the end positions of the pistons 61 and 62. With the parts in the position shown in FIG. 1 the pistons 61, 62 have been moved into their respective end positions in the cylinder 55 under the action of pressure fluid supplied into the compartment located between the pistons. During this piston-spacing movement the piston 61 or 62 has taken the gear shifting shaft 56 with it via the outer lock ring 63 or 65 so that the shaft 56 is in an axially intermediate position corresponding to the neutral position of the shifter collar 41. In order to obtain a more distinct neutral position, the gear shifting shaft 56 is adapted to be locked in conventional manner by a ball locking device, not shown. The same holds true for the two gear ratio positions.

In order to move the shifter collar 41 into the high speed position, pressure fluid is supplied to the right-hand outer compartment of the gear change cylinder 55, and simultaneously pressure fluid is exhausted from the intermediate compartment. As a result, the pressure actuated piston 62 is moved into contact with the lock ring 64 which displaces the gear shifting shaft 56 and the shifter collar 41 connected thereto via the shifter fork 44 until the lock ring 64 and the piston 62 are stopped by the piston 61 which is in its outer end position in the gear change cylinder 55.

In a corresponding manner shifting into low gear is effected by supplying pressure fluid into the left-hand compartment of the gear change cylinder. However, when the vehicle is being driven shifting from one gear ratio position to the other one is normally effected directly. In that case pressure fluid is supplied alternately into the outer compartment of the gear change cylinder 55, and the neutral position is passed merely by the two pistons 61, 62 in contact with the common intermediate lock ring 64.

However, the shifting operations are not only controlled by the gear change cylinder 55 but are accomplished in cooperation with the synchronizing cylinder 54 as mentioned above. Under the action of pressure fluid supplied into the synchronizing cylinder 54 the shifter collar 41 is disengaged from a gear ratio position and is synchronized into another gear ratio position before the fluid pressure in the gear change cylinder 55 finally displaces the shifter collar 41 into the high or low speed position of the supplementary gear box.

Displaceably mounted on the gear shifting shaft 56 within the synchronizing cylinder 54 is a piston 60 which has a sleeve and divides this cylinder into two compartments. The sleeve of the piston 60 extends sealingly through the intermediate member 57 and is movably mounted therein. An entraining member 68 is by means of two lock rings 66 mounted on the sleeve end which projects into the supplementary gear box 54. The entraining member is in the form of a sleeve having in its circumference two opposing cord-like grooves which receive guide pins 69 provided one in each limb of the clutch lever 50. Due to this arrangement the displacing movements of the piston 60 are transmitted to the clutch lever 50 which controls the function of the clutch. The movements of the piston 60 are limited by the compressibility of the disc clutches 10, 11. In order to enable the piston 60 to take the gear shifting shaft 56 with it upon shifting from high speed, the shaft portion in the right-hand compartment of the cylinder has secured to it a lock ring 70 against which the piston 60 is forced. Upon shifting from low speed the sleeve of the piston 60 acts directly on the shifting fork 44 and brings with it the gear shifting shaft 56 and the members associated therewith.

In order to obtain the functional cooperation of the gear change cylinder 55 and the synchronizing cylinder 54 during a shifting operation, the inlet ducts or outlet ducts alternatively, of the two outer compartments of the gear change cylinder 55 are of smaller cross-sectional area than the corresponding ducts of the synchronizing cylinder 54, whereby to obtain different filling velocities in the cylinder.

Each of the compartments of the synchronizing cylinder 54 communicates independently of each other via separate conduits 71 and 72 with a two-way valve 73 and 74, respectively, which by means of screws, not shown, is connected to the front casing 5. The valves are of conventional design, but since their functions in a synchronizing system according to the invention are of importance, the characteristic features of such a valve will be briefly described hereinbelow.

A valve spindle 77 is displaceably mounted in a valve casing 75 and is acted upon by a compression spring 76 which is mounted in a through-flow channel in the casing and bears upon a shoulder. The valve spindle 77 extends through the valve casing 75 and abuts at its outer end against the gear shifting shaft 56 which has transverse trapezoid grooves which upon axial displacements of the shaft 56 cause axial movements of the valve spindle 77.

The other end of the valve spindle 77 is in the water end position or groove-engaging position of the spindle out of contact with a sealing washer 78. The sealing washer is made of rubber or similar material and is biased against the other side of the above named shoulder in the through-flow channel of the valve casing by means of a compression spring 79 which bears against a cover 80 of the valve casing 75. In this position the sealing washer 78 cuts off the air communication between the through-flow channel of the valve casing 75 and a conduit 81 or 83 which in a conventional manner is connected to the cover 80 and communicates with an air pressure chamber, not shown.

The valve spindle 77 has a packing 82 in sealing contact with the internal surface of the through-flow channel. In the outer end position of the valve spindle 77 a chamber defined between the sealing washer 78 and the packing 82 in the valve casing 75 is in communication with the ambient air due to the fact that the valve spindle 77 has an axial central dead end hole which extends from the inner end of the spindle to a diametrical outlet hole, not shown, which opens into the ambient air.

Through the conduit 71 or 72 the above named chamber in the valve casing communicates with one or the other of the two compartments of the synchronizing cylinder 54.

Upon impression of the valve spindle 77 under the action of displacement of the shaft 56 the inner end of the valve spindle 77 is forced, during the first part of the displacement, into contact with the sealing washer 78 resulting in that the outlet of the ambient air is closed. Upon continued impression of the valve spindle 77 the counter pressure of the sealing washer 75 is overcome and the sealing action of the washer comes to an end with the result that air from the air pressure chamber will flow into the valve casing 75 and via the conduit 71 or 72 into the synchronizing cylinder 54.

In order to explain the function of the gear shift bar mechanism prior to, during and after a shifting operation a summary of a shift from high into low speed is given below.

In the high speed position of the supplementary gear box the shifter collar 41 is in engagement with the planet carrier 18 under the action of fluid pressure which in the right-hand compartment of the gear change cylinder acts upon the gear shifting shaft 56. In this position of the gear shifting shaft 56 the disc clutch 10 is disengaged due to the fact that the valve spindle 77 of the two-way valve 74 has entered a transverse groove in the shaft 56 resulting in that the right-hand compartment of the synchronizing cylinder 54 has been disconnected from the air pressure chamber, not shown, and instead thereof communicates with the ambient air. Consequently, no pressure can be exerted on the clutch lever 50 for pressing the discs of the clutch 10 together.

During a shifting operation the servo cyinders 54 and 55 are pressurized by conventional means. The valve 73 is open and pressure fluid is supplied simultaneously into the left-hand compartment of the synchronizing cylinder 54 and gear change cylinder 55, respectively. Because of the restricted inlet to the gear change cylinder 55 the synchronizing cylinder 54 is pressurized prior to the gear change cylinder 55 and forces the piston 60 to the right. By means of the lock ring 70 this piston takes the gear shifting shaft 56 with it and disengages the shifter collar 41 from the planet carrier 18.

At the same time the clutch lever 50 has been moved accordingly, and after having passed the neutral position the lever presses the discs of the clutch 11 together via the clutch plate 33 for synchronizing the speed of the shifter collar 41 with the parts rotating in the low speed position.

During this operation the pressure in the left-hand compartment of the gear change cylinder 55 has successively increased and when the piston 60 of the synchronizing cylinder because of the compressibility of the discs is no longer able to displace the gear shifting shaft 56 the left-hand piston 61 of the gear change cylinder takes over so that the shaft 56 will be further displaced. However, the fluid pressure acting on the piston 61 in the gear change cylinder 55 is counteracted by the frictional resistance between the toothed rims of the shift collar 41 and the internal disc carrier 32, respectively, resulting in that continued displacement of the gear shifting shaft 56 will be time-responsive to the balance between the fluid pressure on the piston 61 and said frictional resistance. Since the frictional resistance varies with the gear ratio position in the main gear box 1, the duration of the shifting operations will be reduced in accordance with the shortened time between low and high speed positions of the main gear box.

Since the frictional resistance of the disc clutch 11 is too high to be overcome upon possibly required turning of the shifter collar 41 into engagement with the gear transmission in the lower speed position, it is necessary to put the synchronizing operation out of function prior to final engagement. This is attained due to the fact that the valve spindle 77 of the two-way valve 73 slides down into a transverse groove in the shaft 56 when this shaft is in an axial position which corresponds to the position of the shifter collar 41 immediately prior to engagement with the toothed clutch plate 28, resulting in that the air communication between the left-hand compartment of the synchronizing cylinder 54 and the air pressure chamber is closed and the channel in the valve spindle 77 opens into the ambient air. The synchronizing operation is put out of action without interrupting the axial displacement of the shifter collar 41 into the final low speed position.

Shifting from low gear into high gear is effected in a corresponding manner with inverted conditions of the parts comprised in the gear shift bar mechanism.

What we claim is:

1. A servo mechanism for synchronizing gear shifting operations of a supplementary gear assembly disposed between a power input shaft and a power output shaft and having a first intermeshing gear means for positively coupling the shafts at a first gear ratio and a second intermeshing gear means for positively coupling the shafts at a second gear ratio, a displaceable shifter collar for alternatively actuating the first and second intermeshing gear means and a shifter fork for displacing the shifter collar,
   the improvement comprising a synchronizing cylinder,
   a gear change cylinder,
   a displaceable gear shifting shaft extending through said synchronizing cylinder and into said gear change cylinder, said shaft extending parallel to the power output shaft, the shifter fork being secured thereto,
   a pair of friction disc clutches coaxially mounted about the output shaft,
   a clutch lever displaceably mounted on said gear shifting shaft for alternatively effecting engagement of said disc clutches,
   means for actuating one of the intermeshing gear means by each of said disc clutches when each clutch is separately engaged by said clutch lever to synchronize the gear shifting operation,
   a synchronizing piston displaceably mounted on said gear shifting shaft in the synchronizing cylinder for actuating said clutch lever,
   at least one piston mounted on said gear shifting shaft in the gear change cylinder,
   fluid pressure means for displacing said synchronizing piston and subsequently displacing said at least one piston in said gear change cylinder, said gear shifting shaft and the shifter fork secured thereto, and
   means for inactivating the fluid pressure means for said synchronizing piston when said gear shifting shaft has been displaced.

2. A mechanism as claimed in claim 1 wherein the force exerted on the synchronizing piston by the fluid pressure means is substantially half of the pressure of the friction disc clutch during engagement thereof.

3. A mechanism as claimed in claim 1 and further comprising servo-means for controlling the fluid pressure means and conduit means from said servo means to both sides of each piston in said synchronizing cylinder and said gear change cylinder.

4. A mechanism as claimed in claim 3 wherein said means for inactivating the fluid pressure means comprises valve means interposed in said conduit means to said synchronizing cylinder and further comprising means on said gear shifting shaft for actuating said valve means.

5. A mechanism as claimed in claim 3 wherein two spaced pistons are provided in said gear change cylinder and wherein said conduit means to the outersides of said two pistons have a smaller cross-sectional area than said conduit means to said synchronizing cylinder.

6. A mechanism as claimed in claim 5, and further comprising means mounted on the gear shifting shaft in the gear change cylinder for limiting the displacement of the pistons thereon and for limiting the displacement of said gear shifting shaft.

7. A mechanism as claimed in claim 1 wherein the synchronizing piston includes a sleeve-like extension on which said clutch lever is mounted.

8. A mechanism as claimed in claim 1 wherein said synchronizing piston when displaced, displaces said gear shifting shaft to actuate the shifter fork to disengage the intermeshing gear means and also displace said clutch lever to effect engagement of said friction disc clutches to synchronize rotational speed of the shifter collar and the intermeshing gear means and wherein said at least one piston in said gear change cylinder continues the displacement of said gear shifting shaft to effect further displacement of the shifter collar to effect positive coupling of the power input shaft and the power output shaft by the first or second intermeshing gear means.

9. A mechanism as claimed in claim 1 and further comprising a casing for the supplementary gear assembly and wherein said synchronizing cylinder, said gear change cylinder and said gear shifting shaft are combined as a unit and secured to said casing.

10. A servo mechanism for synchronizing gear shifting operations of a supplementary gear assembly having an input shaft, an output shaft, planetary gearing interconnecting said two shafts for driving the output shaft at different speeds, said planetary gearing including a ring gear driven by said input shaft, planetary gears meshed with the ring gear and secured to a planet carrier and a sun gear, said sun gear including a shifter collar axially displaceable and non-rotatably mounted thereon, and a shifter fork for displacing the collar, said collar including two sets of axially spaced teeth thereabout, one set of teeth on the collar being engageable with a toothed gear forming part of the planet carrier, the other set of teeth being engageable with a stationary toothed gear secured to the housing, a pair of friction clutches coaxially mounted about the collar, one of said clutches including a set of plates secured to the planet carrier and another set of plates secured to said collar, the other of said clutches including a set of stationary plates secured to the housing and another set of plates secured to said collar, a shifter fork for alternatively actuating the collar in one direction or the other to mesh one of said sets of teeth thereon with the toothed gear of the planet carrier or to mesh the other set of teeth with the stationary toothed gear, the improvement comprising a synchronizing cylinder,
a gear change cylinder,
a displaceable gear shifting shaft extending through said synchronizing cylinder and into said gear change cylinder, said shaft extending parallel to the power output shaft, the shifter fork being secured thereto,
a clutch lever displaceably mounted on said gear shifting shaft for alternatively effecting engagement of said clutch plates,
a synchronizing piston displaceably mounted on said gear shifting shaft in the synchronizing cylinder for actuating said clutch lever,
at least one piston mounted on said gear shifting shaft in the gear change cylinder,
fluid pressure means for displacing said synchronizing piston and subsequently displacing said at least one piston in said gear change cylinder, said gear shifting shaft and the shifter fork secured thereto, and
means for inactivating the fluid pressure means for said synchronizing piston when said gear shifting shaft has been displaced.

References Cited

UNITED STATES PATENTS

| | | |
|---|---|---|
| 2,547,732 | 4/1951 | Baker. |
| 3,161,270 | 12/1964 | Aschauer. |
| 3,252,553 | 5/1966 | Peterson _____ 192—48.7 X |
| 3,300,004 | 1/1967 | Peterson _____ 192—48.7 |

LEONARD H. GERIN, Primary Examiner

U.S. Cl. X.R.

74—339, 781; 192—53